(12) United States Patent
Tanaka et al.

(10) Patent No.: US 12,204,122 B2
(45) Date of Patent: Jan. 21, 2025

(54) DISPLAY APPARATUS

(71) Applicant: SONY GROUP CORPORATION, Tokyo (JP)

(72) Inventors: Akira Tanaka, Tokyo (JP); Yuji Nakahata, Tokyo (JP); Tomoya Yano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 734 days.

(21) Appl. No.: 17/298,730

(22) PCT Filed: Nov. 21, 2019

(86) PCT No.: PCT/JP2019/045606
§ 371 (c)(1),
(2) Date: Jun. 1, 2021

(87) PCT Pub. No.: WO2020/121771
PCT Pub. Date: Jun. 18, 2020

(65) Prior Publication Data
US 2022/0050236 A1     Feb. 17, 2022

(30) Foreign Application Priority Data
Dec. 10, 2018 (JP) .................... 2018-230783

(51) Int. Cl.
*G02B 5/20*      (2006.01)
*G02B 5/32*      (2006.01)
(Continued)

(52) U.S. Cl.
CPC .............. *G02B 5/20* (2013.01); *G02B 5/32* (2013.01); *G03B 21/60* (2013.01); *G03H 1/0248* (2013.01)

(58) Field of Classification Search
CPC . G02B 30/56; G02B 5/20; G02B 5/32; G02B 26/101; G03B 21/60; G03B 21/10;
(Continued)

(56) References Cited

U.S. PATENT DOCUMENTS 11,188,025 B2 *   11/2021   Tokuchi ................. G03H 1/02
2002/0089710 A1     7/2002   Mizutani et al.
(Continued)

FOREIGN PATENT DOCUMENTS

DE        10200380 A      9/2002
JP       2000-352764 A     12/2000
(Continued)

OTHER PUBLICATIONS

International Search Report and Written Opinion of PCT Application No. PCT/JP2019/045606, issued on Feb. 10, 2020, 09 pages of ISRWO.

*Primary Examiner* — Stephone B Allen
*Assistant Examiner* — Jyotsna V Dabbi
(74) *Attorney, Agent, or Firm* — CHIP LAW GROUP

(57) ABSTRACT

There is provided a display apparatus of the present invention includes a transparent screen configured by a transmissive or reflective volume hologram, a first image projection section disposed on a first main surface side of the transparent screen, and projecting first image light onto the first main surface; and a second image projection section disposed on a second main surface side of the transparent screen, and projecting second image light onto the second main surface. The display apparatus further includes a first light shielding section preventing external light from being directly incident on the first main surface at least at same incident angle as the first image light, and a second light-shielding section preventing external light from being
(Continued)

directly incident on the second main surface at least at same angle as the second image light.

6 Claims, 13 Drawing Sheets

(51) Int. Cl.
*G03B 21/60* (2014.01)
*G03H 1/02* (2006.01)

(58) Field of Classification Search
CPC ...... G03B 31/00; G03B 21/62; G03H 1/0248; G03H 2001/2231; G03H 2001/2234; G03H 2227/05; H04N 9/3129; H04N 9/3164

See application file for complete search history.

(56) References Cited

U.S. PATENT DOCUMENTS

| | | | |
|---|---|---|---|
| 2006/0098279 A1* | 5/2006 | Yamauchi | G03B 21/56 359/449 |
| 2012/0208109 A1* | 8/2012 | Takemori | G03H 1/04 430/2 |
| 2018/0094791 A1* | 4/2018 | Lee | G03H 1/2294 |
| 2018/0149791 A1* | 5/2018 | Urness | G02B 27/4272 |
| 2018/0217490 A1 | 8/2018 | Shin et al. | |
| 2018/0275505 A1* | 9/2018 | Tao | G02B 5/0278 |
| 2020/0371472 A1* | 11/2020 | Karafin | G03H 1/0005 |

FOREIGN PATENT DOCUMENTS

| | | |
|---|---|---|
| JP | 2002-277962 A | 9/2002 |
| JP | 2006-227581 A | 8/2006 |
| KR | 10-2018-0090115 A | 8/2018 |

* cited by examiner

[FIG. 1]
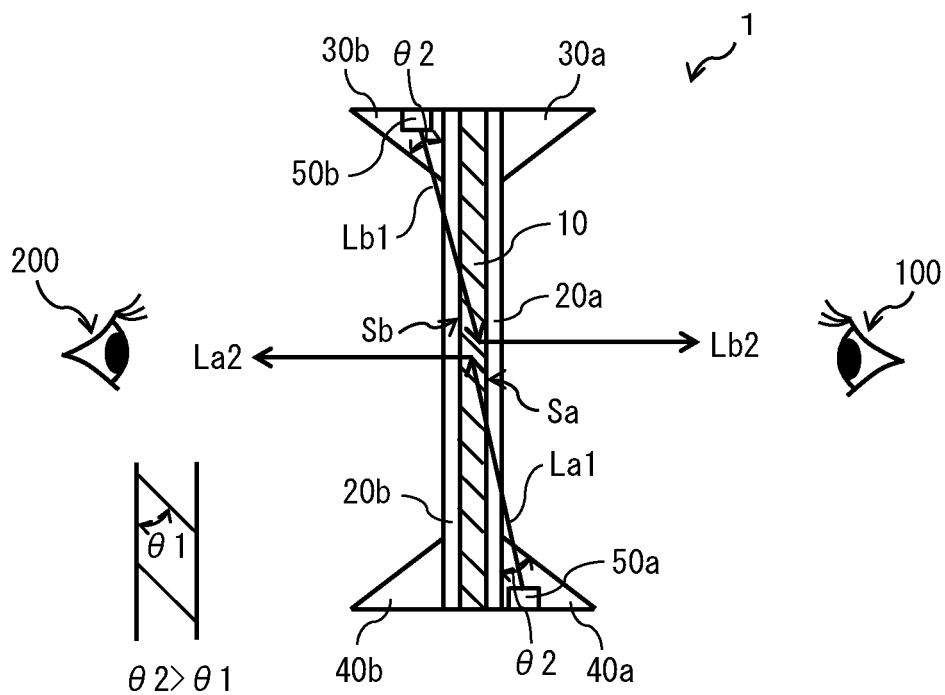
[FIG. 2]
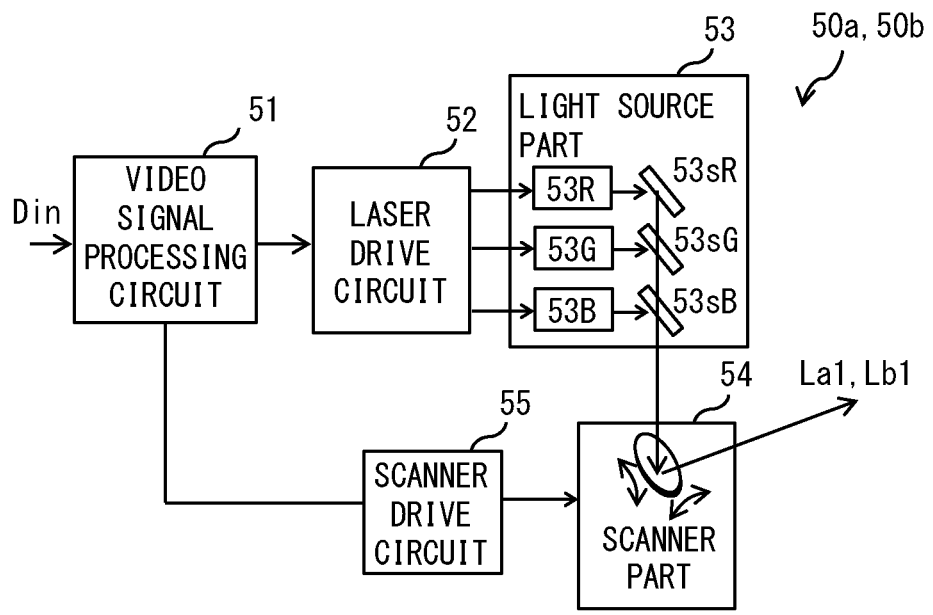

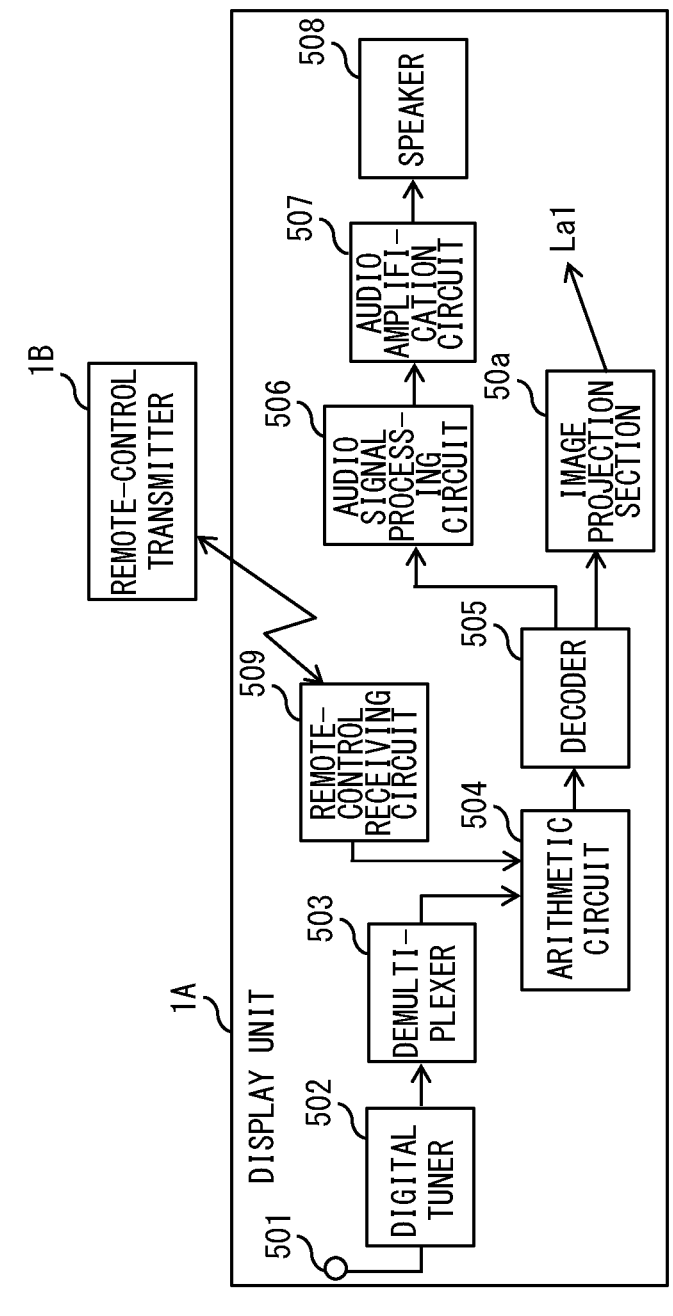
[FIG. 3]

[FIG. 4]
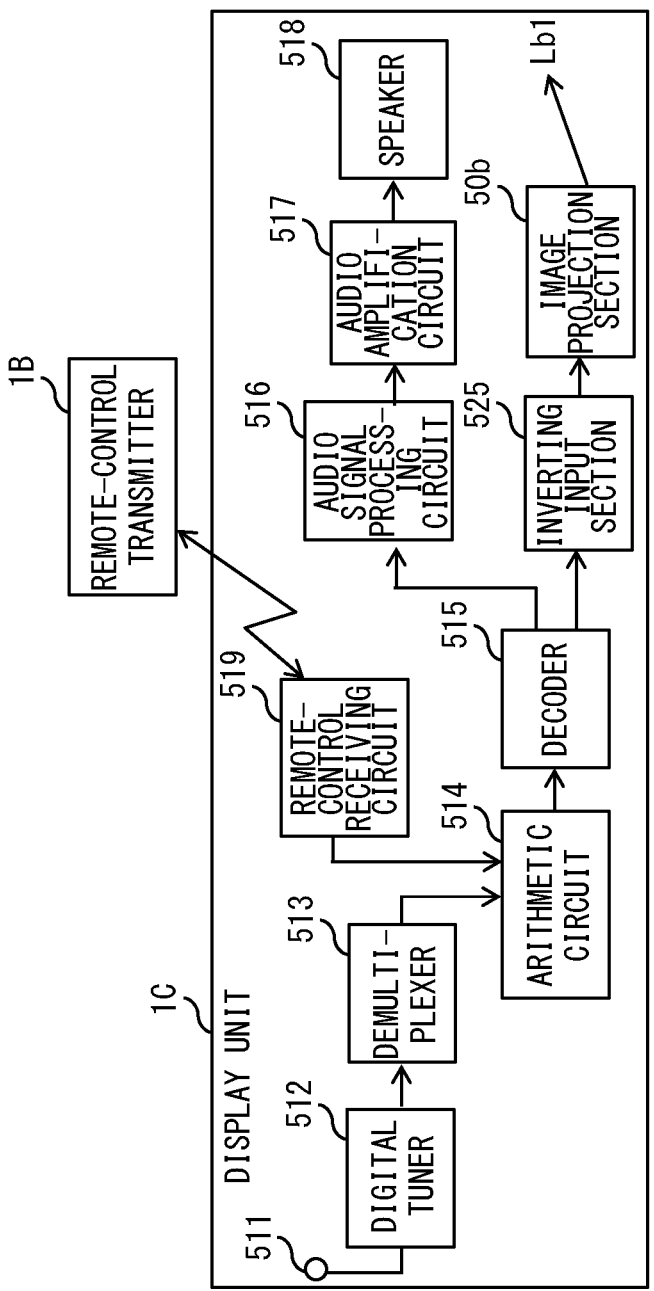

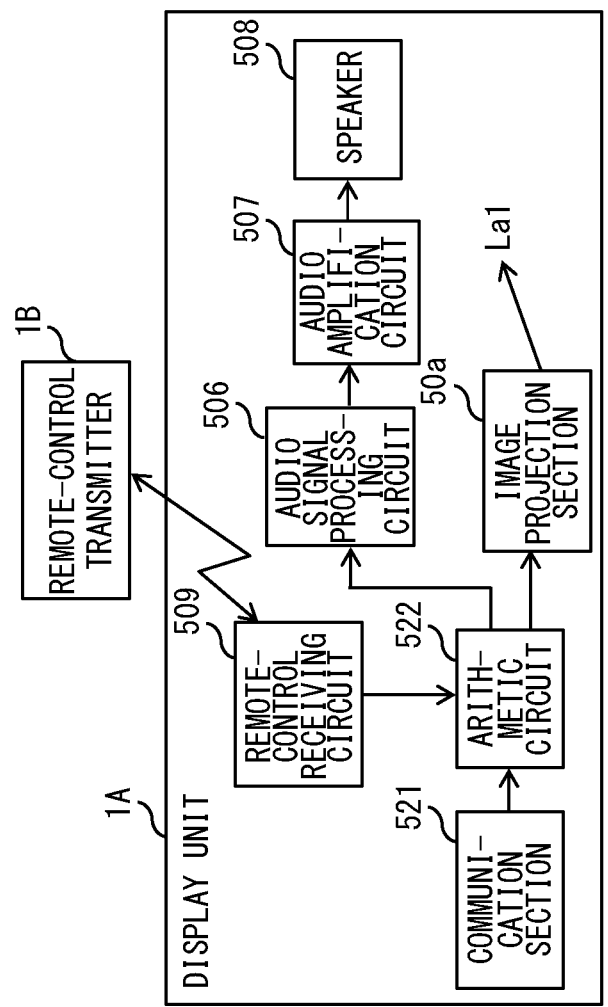
[FIG. 5]

[FIG. 6]
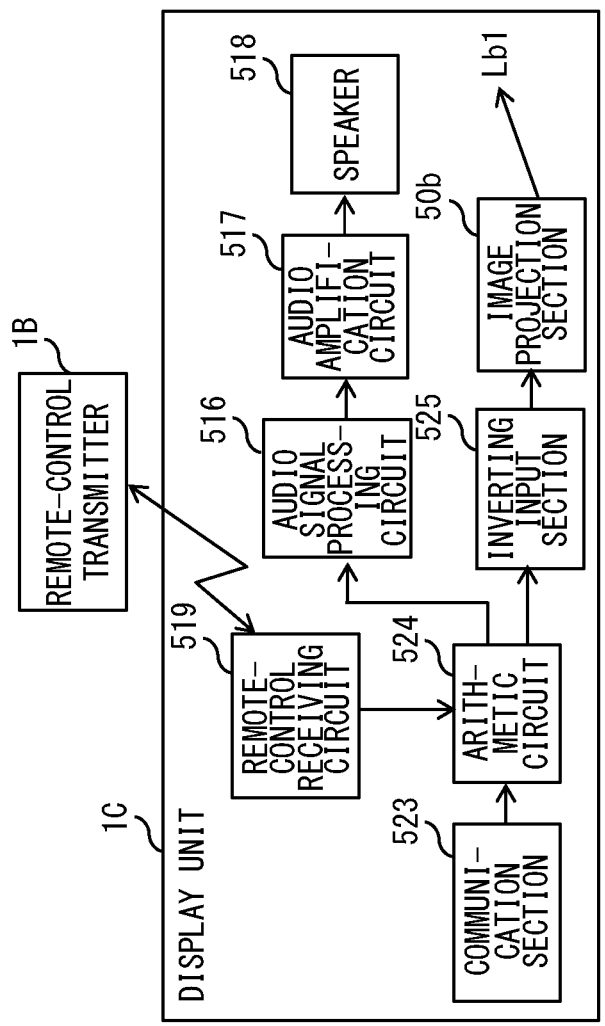

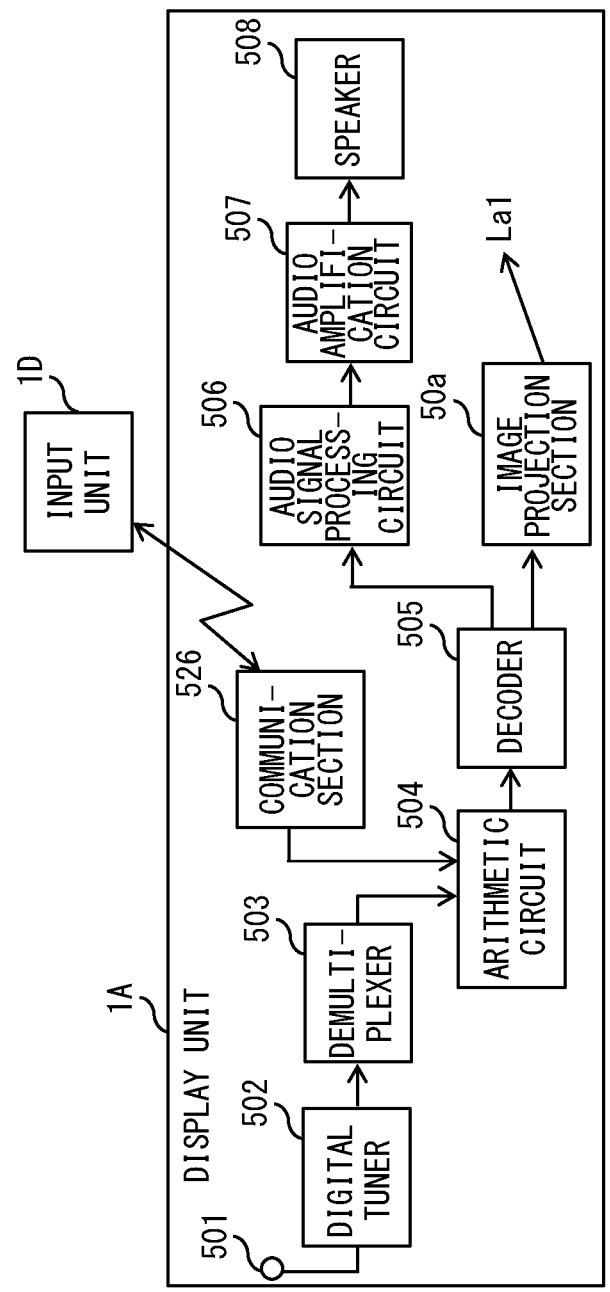
[FIG. 7]

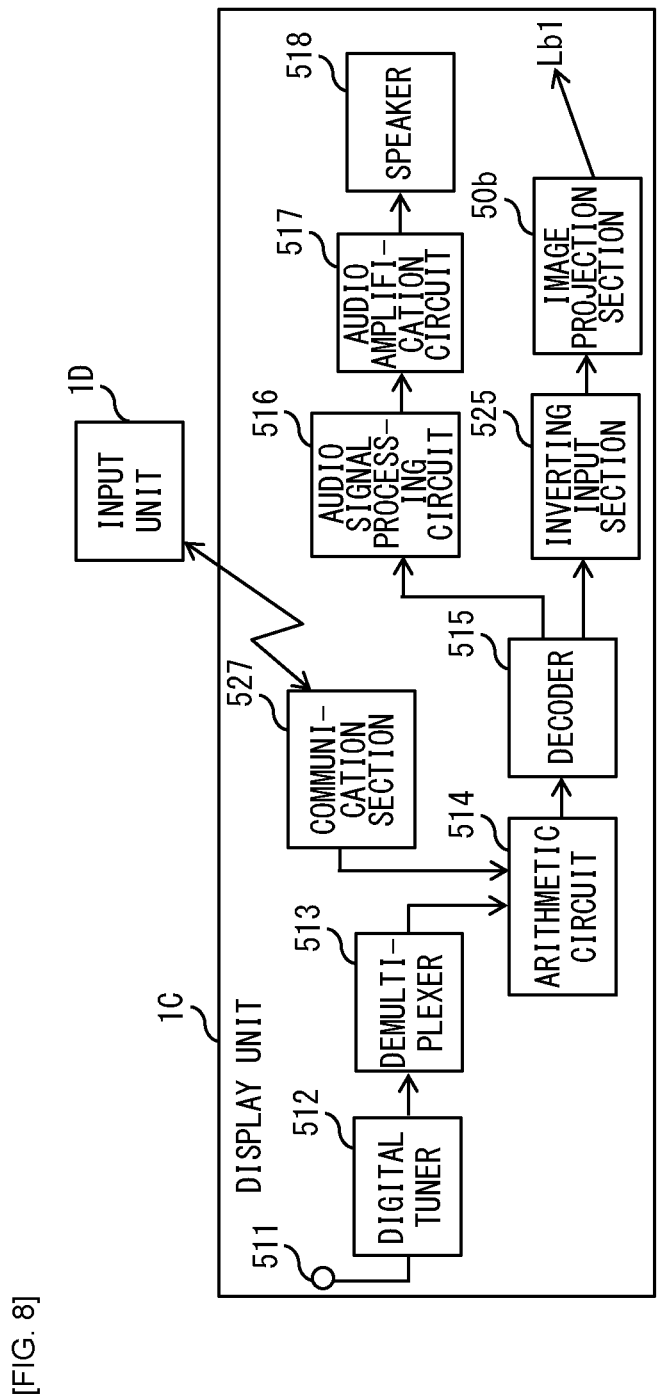
[FIG. 8]

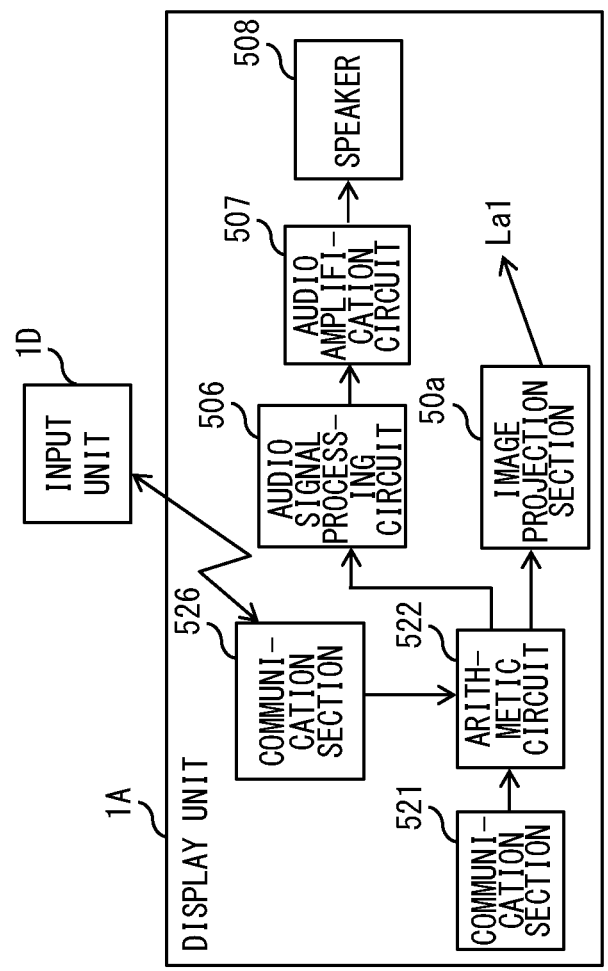
[FIG. 9]

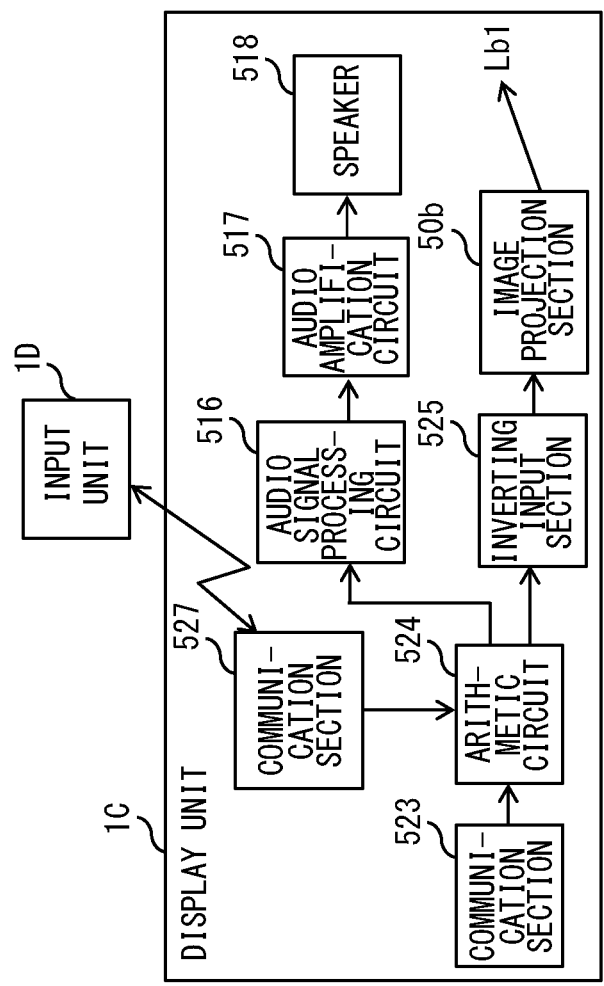
[FIG. 10]

[FIG. 11]
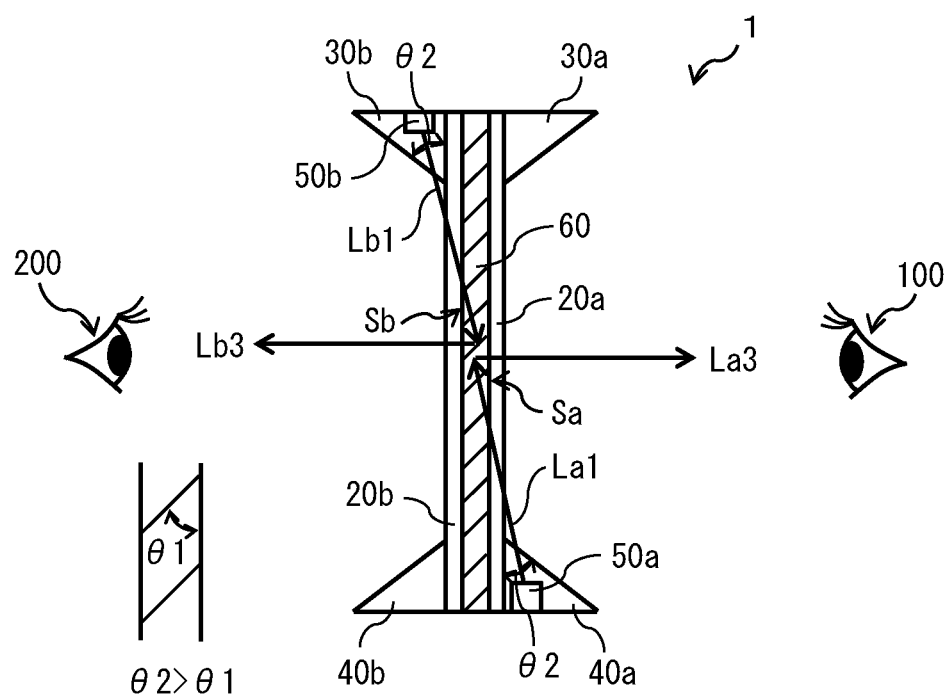

[FIG. 12]
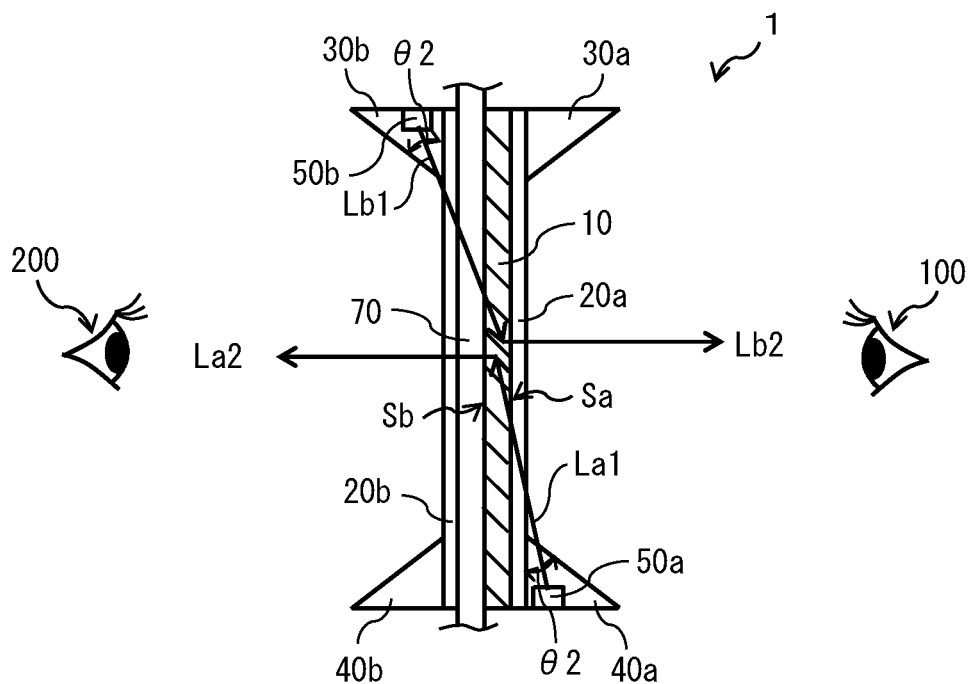
[FIG. 13]
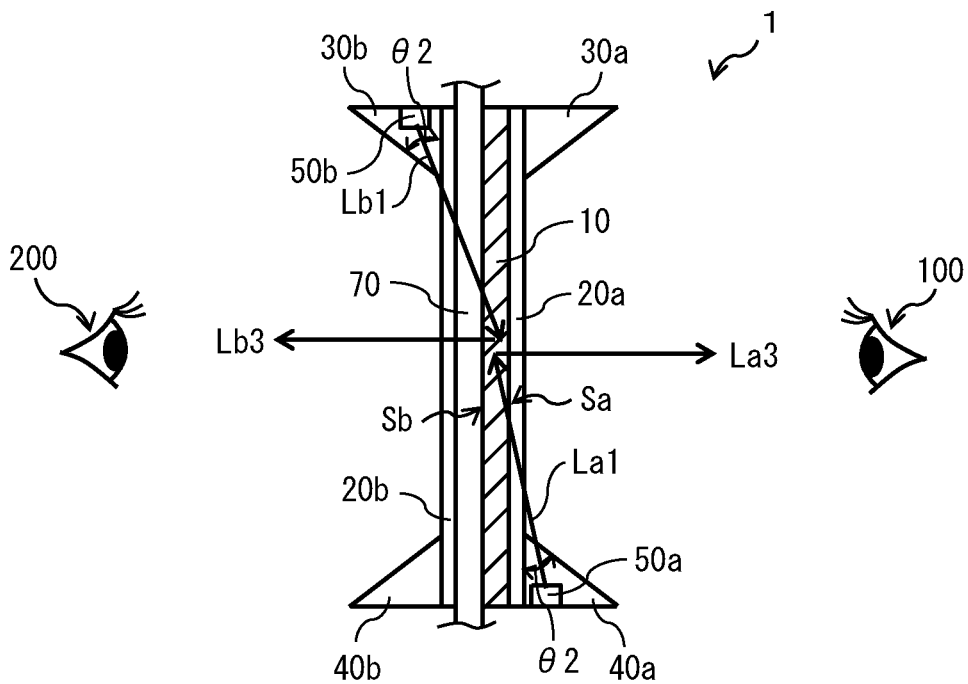

[FIG. 14]
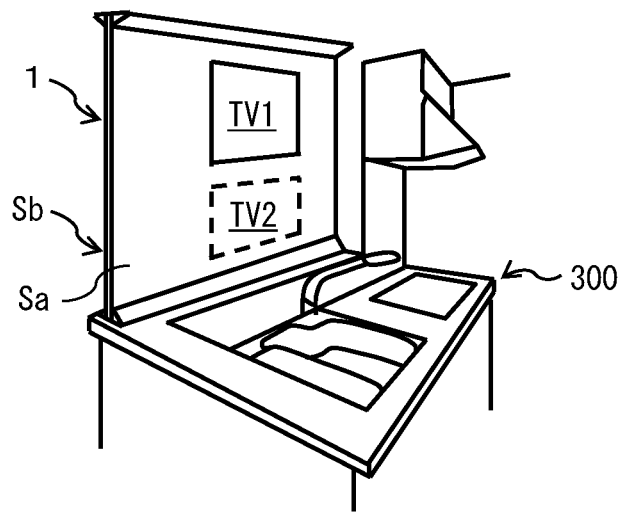
[FIG. 15]
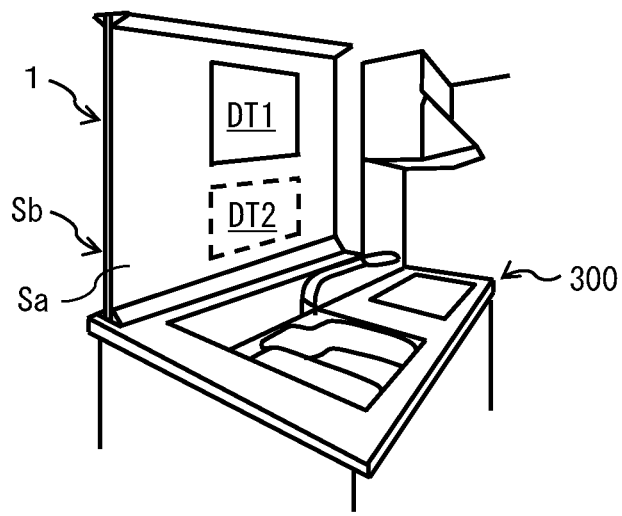

[FIG. 16]
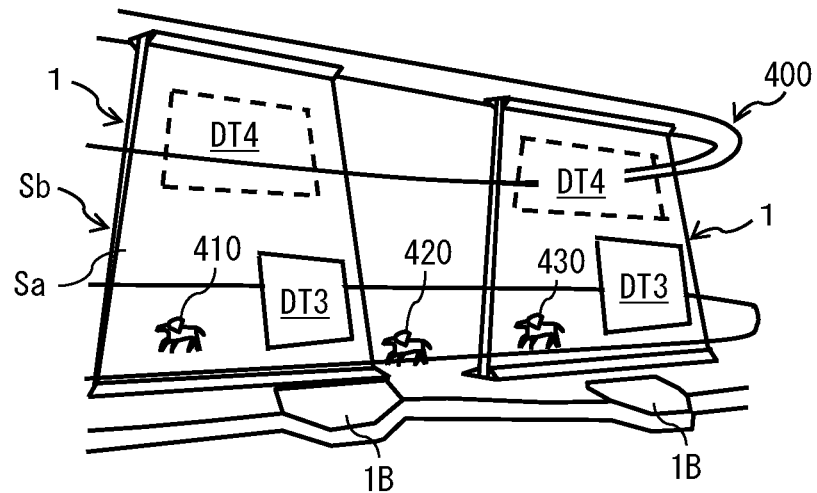
[FIG. 17]
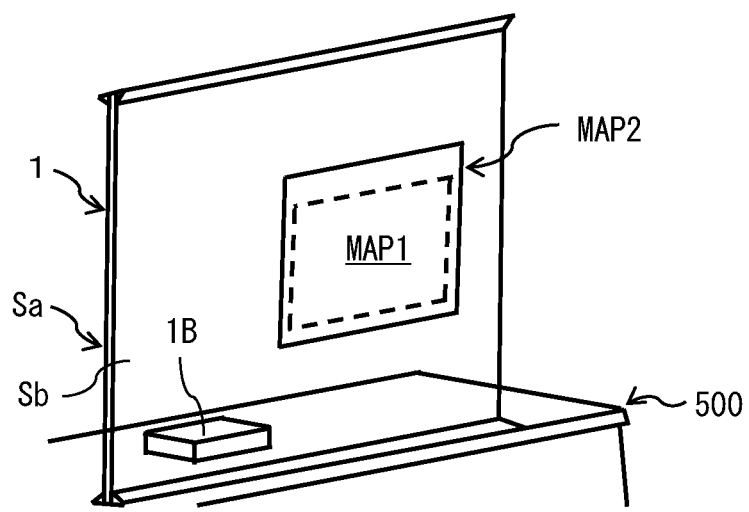

DISPLAY APPARATUS

CROSS REFERENCE TO RELATED APPLICATIONS

This application is a U.S. National Phase of International Patent Application No. PCT/JP2019/045606 Nov. 21, 2019, which claims priority benefit of Japanese Patent Application No. JP 2018-230783 filed in the Japan Patent Office on Dec. 10, 2018. Each of the above-referenced applications is hereby incorporated herein by reference in its entirety.

TECHNICAL FIELD

The present disclosure relates to a display apparatus that is able to display an image on each surface of a transparent screen.

BACKGROUND ART

For example, PTL 1 discloses a display apparatus that displays an image on each surface of a transparent screen.

CITATION LIST

Patent Literature

PTL 1: Japanese Unexamined Patent Application Publication No. 2006-227581

SUMMARY OF THE INVENTION

In the field of the display apparatus described above, diffracted external light is superimposed on image light, thereby making it difficult to clearly display an image in a bright environment, which is an issue. Therefore, a display apparatus that is able to clearly display an image in a bright environment is provided.

A display apparatus according to an embodiment of the present disclosure includes: a transparent screen configured by a transmissive or reflective volume hologram; a first image projection section that is disposed on side of a first main surface of the transparent screen, and projects first image light onto the first main surface; and a second image projection section that is disposed on side of a second main surface of the transparent screen, and projects second image light onto the second main surface. The display apparatus further includes: a first light-shielding section that prevents external light from being directly incident on the first main surface at least at the same angle as the first image light; and a second light-shielding section that prevents external light from being directly incident on the second main surface at least at the same angle as the second image light.

The display apparatus according to an embodiment of the present disclosure includes the first light-shielding section that prevents external light from being directly incident on the first main surface at least at the same angle as the first image light, and the second light-shielding section that prevents external light from being directly incident on the second main surface at least at the same angle as the second image light. This makes it possible to prevent diffracted external light from being superimposed on image light.

BRIEF DESCRIPTION OF THE DRAWINGS

FIG. 1 illustrates an example of a cross-sectional configuration of a display apparatus according to an embodiment of the present disclosure.

FIG. 2 illustrates an example of functional blocks of an image projection section of FIG. 1.

FIG. 3 illustrates an example of functional blocks of a display unit incorporated in the display apparatus of FIG. 1.

FIG. 4 illustrates an example of functional blocks of a display unit incorporated in the display apparatus of FIG. 1.

FIG. 5 illustrates a modification example of functional blocks of the display unit incorporated in the display apparatus of FIG. 1.

FIG. 6 illustrates a modification example of functional blocks of the display unit incorporated in the display apparatus of FIG. 1.

FIG. 7 illustrates a modification example of functional blocks of the display unit incorporated in the display apparatus of FIG. 1.

FIG. 8 illustrates a modification example of functional blocks of the display unit incorporated in the display apparatus of FIG. 1.

FIG. 9 illustrates a modification example of functional blocks of the display unit incorporated in the display apparatus of FIG. 1.

FIG. 10 illustrates a modification example of functional blocks of the display unit incorporated in the display apparatus of FIG. 1.

FIG. 11 illustrates a modification example of a cross-sectional configuration of the display apparatus of FIG. 1.

FIG. 12 illustrates a modification example of a cross-sectional configuration of the display apparatus of FIG. 1.

FIG. 13 illustrates a modification example of a cross-sectional configuration of the display apparatus of FIG. 11.

FIG. 14 illustrates an example of the display apparatus provided as a partition in a kitchen.

FIG. 15 illustrates an example of the display apparatus provided as a partition in the kitchen.

FIG. 16 illustrates an example of the display apparatus provided as a screen of a game machine.

FIG. 17 illustrates an example of the display apparatus provided on a reception table.

MODES FOR CARRYING OUT THE INVENTION

Hereinafter, description is given in detail, with reference to the drawings, of embodiments for carrying out the present disclosure. It is to be noted that the description is given in the following order.

1. EMBODIMENT (FIGS. 1 TO 4)

An example of displaying respective different television programs on the front and back of a transmissive transparent screen

2. MODIFICATION EXAMPLES

Modification Example A: An example of displaying an image acquired by data communication on the front and back of a transparent screen (FIGS. 5 and 6)

Modification Example B: An example of preforming display control using an input unit configured by a mobile terminal, a smartphone, a keyboard, a mouse, or the like (FIGS. 7 to 10)

Modification Example C: An example of providing a reflective transparent screen (FIG. 11)

Modification Example D: An example of a transparent screen attached to a glass plate (FIGS. 12 and 13)

3. APPLICATION EXAMPLES

Application Example 1: An example of a display apparatus provided as a partition in a kitchen (FIGS. 14 and 15)
Application Example 2: An example of a display apparatus provided as a screen of a game machine (FIG. 16)
Application Example 3: An example of a display apparatus provided on a reception table (FIG. 17)

1. EMBODIMENT

Configuration

FIG. 1 illustrates an example of a cross-sectional configuration of a display apparatus 1 according to an embodiment of the present disclosure. The display apparatus 1 includes an HOE (Holographic Optical Element; holographic optical element) screen 10, which is a transparent screen, and displays an image on each surface of the HOE screen 10. The screen 10 corresponds to a specific example of a "transparent screen" of the present disclosure. The HOE screen 10 is configured by a transmissive volume hologram. The HOE screen 10 diffracts light incident at an angle near such an angle as to satisfy Bragg's diffraction condition for the transmissive volume hologram, out of light (image light La1 described later) incident on a first main surface Sa, to side of a second main surface Sb. The diffracted light at this time is emitted as image light La2 from the second main surface Sb. The HOE screen 10 further diffracts light incident at an angle near such an angle as to satisfy the Bragg's diffraction condition for the transmissive volume hologram, out of light (image light Lb1 described later) incident on the second main surface Sb, to side of the first main surface Sa. The diffracted light at this time is emitted as image light Lb2 from the first main surface Sa. An interference fringe with an inclination angle (a slant angle θ1) is formed on the HOE screen 10. Here, the inclination angle (slant angle θ1) refers to an angle formed between a surface of the transmissive volume hologram and the interference fringe. The interference fringe is formed from the inside of the transmissive volume hologram to the surface thereof. The interference fringe satisfies the Bragg condition.

The display apparatus 1 further includes an AR (Anti-Reflection; antireflection) film 20a disposed on the side of the first main surface Sa of the HOE screen 10, and an AR film 20b disposed on the side of the second main surface Sb of the HOE screen 10. The AR film 20a is attached to the first main surface Sa of the HOE screen 10, for example, to suppress reflection of unnecessary incident light (e.g., external light or secondary image light La1 by interfacial reflection). The AR film 20b is attached to the second main surface Sb of the HOE screen 10, for example, to suppress reflection of incident light (e.g., image light Lb1 or external light). It is to be noted that at least one of the AR film 20a or the AR film 20b may be omitted, as necessary.

The display apparatus 1 further includes two image projection sections 50a and 50b. The image projection section 50a corresponds to a specific example of a "first image projection section" of the present disclosure. The image projection section 50b corresponds to a specific example of a "second image projection section" of the present disclosure.

The image projection section 50a projects the image light La1 onto the first main surface Sa. The image projection section 50a is disposed on the side of the first main surface Sa of the HOE screen 10, and is disposed at a location corresponding to a lower end of the HOE screen 10. The image projection section 50a is configured to cause the image light La1 to be incident on the first main surface Sa at an angle near such an angle as to satisfy the Bragg's diffraction condition for the transmissive volume hologram. The image projection section 50a is further configured to cause the image light La1 to be diffracted to the side of the second main surface Sb in the transmissive volume hologram.

The image projection section 50b projects the image light Lb1 onto the second main surface Sb. The image projection section 50b is disposed on the side of the second main surface Sb of the HOE screen 10, and is disposed at a location corresponding to an upper end of the HOE screen 10. The image projection section 50b is configured to cause the image light Lb1 to be incident on the second main surface Sb at an angle near such an angle as to satisfy the Bragg's diffraction condition for the transmissive volume hologram. The image projection section 50b is further configured to cause the image light Lb1 to be diffracted to the side of the first main surface Sa in the transmissive volume hologram.

The display apparatus 1 further includes two eave sections 30a and 30b and two base sections 40a and 40b. The base section 40a corresponds to a specific example of a "first light-shielding section" of the present disclosure. The eave section 30b corresponds to a specific example of a "second light-shielding section" of the present disclosure.

The eave sections 30a and 30b are each disposed at a location corresponding to the upper end of the HOE screen 10. The eave section 30a and the eave section 30b are disposed at positions opposed to each other with the HOE screen 10 interposed therebetween. The eave section 30a is disposed on the side of the first main surface Sa of the HOE screen 10, and the eave section 30b is disposed on the side of the second main surface Sb of the HOE screen 10. The eave sections 30a and 30b hold the location corresponding to the upper end of the HOE screen 10. The eave section 30a has an inclined surface with an angle θ2 larger than the slant angle θ1 of the volume hologram. The eave section 30b has an inclined surface with the angle θ2 larger than the slant angle θ1 of the volume hologram. The eave sections 30a and 30b (in particular, the inclined surfaces) are each positioned at a distance of a tangent at the slant angle θ1 of the volume hologram, from the location corresponding to the upper end of the HOE screen 10. The eave section 30b (particularly, the inclined surface) prevents external light from being directly incident on the second main surface Sb at least at the same incident angle as that of the image light Lb1 from side of the eave section 30b.

The base sections 40a and 40b are each disposed at a location corresponding to the lower end of the HOE screen 10. The base section 40a and the base section 40b are disposed at positions opposed to each other with the HOE screen 10 interposed therebetween. The base section 40a is disposed on the side of the first main surface Sa of the HOE screen 10, and the base section 40b is disposed on the side of the second main surface Sb of the HOE screen 10. The base sections 40a and 40b hold the location corresponding to the lower end of the HOE screen 10. The base section 40a has an inclined surface with the angle θ2 larger than the slant angle θ1 of the volume hologram. The base section 40b has an inclined surface with the angle θ2 larger than the slant angle θ1 of the volume hologram. The base sections 40a and 40b (in particular, the inclined surfaces) are each positioned at a distance of a tangent at the slant angle of the volume hologram, from the location corresponding to the lower end of the HOE screen 10. The base section 40a (particularly, the inclined surface) prevents external light from being directly incident on the first main surface Sa at least at the same incident angle as that of the image light La1 from side of the base section 40a.

In a case where at least a portion of the inclined surface of the eave section 30b is configured by a material that transmits the image light Lb1, the image projection section 50b may irradiate the second main surface Sb with the image light Lb1 through a location, of the inclined surface of the eave section 30b, configured by the material that transmits the image light Lb1. At this time, the image projection section 50b is disposed (accommodated) inside the eave section 30b. In a case where at least a portion of the inclined surface of the base section 40a is configured by a material that transmits the image light La1, the image projection section 50a may irradiate the first main surface Sa with the image light La1 through a location, of the inclined surface of the base section 40a, configured by the material that transmits the image light La1. At this time, the image projection section 50a is disposed (accommodated) inside the base section 40a.

Next, description is given of inner configurations of the image projection sections 50a and 50b.

The image projection sections 50a and 50b are each a device that projects an image based on an externally inputted image signal Din onto the HOE screen 10, for example, as illustrated in FIG. 2. The image projection sections 50a and 50b each include, for example, a video signal processing circuit 51, a laser drive circuit 52, a light source part 53, a scanner part 54, and a scanner drive circuit 55.

The video signal processing circuit 51 generates a projection image signal for each color on the basis of the image signal Din. On the basis of the projection image signal for each color, the laser drive circuit 52 controls a peak value of a current pulse to be applied to light sources 53R, 53G, and 53B described later.

The light source part 53 includes a plurality of light sources, for example, the three light sources 53R, 53G, and 53B. The three light sources 53R, 53G, and 53B are used as respective laser light sources that emit laser light beams of wavelengths of red (R), green (G), and blue (B), for example. The respective laser light beams emitted from the three light sources 53R, 53G, and 53B are, for example, substantially collimated by collimating lenses, and thereafter combined into a single laser light beam by beam splitters 53sR, 53sG, and 53sB, etc. The beam splitter 53sR reflects red light, for example. The beam splitter 53sG reflects green light, and transmits red light, for example. The beam splitter 53sB reflects blue light, and transmits red light and green light, for example.

The laser light beams transmitted and reflected by the beam splitters 53sR, 53sG, and 53sB are incident on the scanner part 54. The scanner part 54 is configured by using one biaxial scanner, for example. The incident laser light beam is modulated by the biaxial scanner in terms of an irradiation angle in horizontal and vertical directions, and then projected onto the screen. It is to be noted that the scanner part 54 may be configured to use two uniaxial scanners for scanning in a horizontal direction and a vertical direction.

Typically, the scanner part 54 includes a sensor that detects an irradiation angle of the biaxial scanner or the like, and the sensor outputs horizontal and vertical angular signals. The angular signals are inputted to the scanner drive circuit 55. On the basis of the horizontal angular signal and the vertical angular signal inputted from the scanner part 54, for example, the scanner drive circuit 55 drives the scanner part 54 to have a desired irradiation angle. It is to be noted that the image projection sections 50a and 50b are not limited to the above-described configurations, and may be configured differently from the above-described configurations.

FIG. 3 illustrates an example of functional blocks of a display unit 1A incorporated in the display apparatus 1. FIG. 4 illustrates an example of functional blocks of a display unit 1C incorporated in the display apparatus 1. The display unit 1A includes the above-described image projection section 50a. The display unit 1C includes the above-described image projection section 50b. The display apparatus 1 includes the display unit 1A, the display unit 1C, and a remote-control (remote control) transmitter 1B for remote operation of the display units 1A and 1C. The remote-control transmitter 1B may be a device dedicated to the remote operation of the display units 1A and 1C, or may be a mobile terminal such as a smartphone in which an application enabling the remote operation of the display units 1A and 1C is installed.

The display unit 1A is, for example, a projector that is able to receive a television broadcasting signal by wire or wirelessly. The display unit 1A includes, for example, an antenna terminal 501, a digital tuner 502, a demultiplexer 503, and an arithmetic circuit 504. The display unit 1A further includes, for example, a decoder 505, the image projection section 50a, an audio signal processing circuit 506, an audio amplification circuit 507, a speaker 508, and a remote-control receiving circuit 509.

The antenna terminal 501 is a terminal to which a television broadcasting signal received by a reception antenna (unillustrated) is inputted. The digital tuner 502 processes the television broadcasting signal inputted to the antenna terminal 501, for example, to output a predetermined transport stream corresponding to a channel selected by a user. The demultiplexer 503 extracts a partial TS (Transport Stream) corresponding to the channel selected by the user, for example, from the transport stream obtained by the digital tuner 502.

The arithmetic circuit 504 controls an operation of each of the sections of the display unit 1A. The arithmetic circuit 504 transmits, for example, the partial TS obtained by the demultiplexer 503 to the decoder 505. In addition, the arithmetic circuit 504 controls an operation of the demultiplexer 503 and the operation of each of the sections of the display unit 1A, for example, on the basis of setting information inputted from the remote-control receiving circuit 509. On the basis of the setting information inputted from the remote-control receiving circuit 509, for example, the arithmetic circuit 504 further generates image data for a UI (User Interface) to be used for screen displaying, and outputs the generated image data to the image projection section 50a (video signal processing circuit 51).

The decoder 505 performs decode processing, for example, on an image PES (Packetized Elementary Stream) packet included in the partial TS obtained by the demultiplexer 503 to thereby obtain image data. In addition, the decoder 505 performs the decode processing, for example, on an audio PES packet included in the partial TS obtained by the demultiplexer 503 to thereby obtain audio data.

On the basis of the image data inputted from the decoder 505, the image projection section 50a generates the image light La1, and irradiates the first main surface Sa.

The audio signal processing circuit 506 performs processing such as D/A conversion, for example, on the audio data obtained by the decoder 505. The audio amplification circuit 507 amplifies the audio signal outputted from the audio signal processing circuit 506, for example, to supply the amplified audio signal to the speaker 508.

The remote-control receiving circuit 509 receives a remote-control signal transmitted from the remote-control transmitter 1B, for example, to supply the received remote-control signal to the arithmetic circuit 504.

The display unit 1C is, for example, a projector that is able to receive a television broadcasting signal by wire or wirelessly. The display unit 1C includes, for example, an antenna terminal 511, a digital tuner 512, a demultiplexer 513, and an arithmetic circuit 514. The display unit 1C further includes, for example, a decoder 515, an inverting input section 525, the image projection section 50b, an audio signal processing circuit 516, an audio amplification circuit 517, a speaker 518, and a remote-control receiving circuit 519.

The antenna terminal 511 is a terminal to which a television broadcasting signal received by a reception antenna (unillustrated) is inputted. The digital tuner 512 processes the television broadcasting signal inputted to the antenna terminal 511, for example, to output a predetermined transport stream corresponding to a channel selected by a user. The demultiplexer 513 extracts a partial TS corresponding to the channel selected by the user, for example, from the transport stream obtained by the digital tuner 512.

The arithmetic circuit 514 controls an operation of each of the sections of the display unit 1C. The arithmetic circuit 514 transmits, for example, the partial TS obtained by the demultiplexer 513 to the decoder 515. In addition, the arithmetic circuit 514 controls an operation of the demultiplexer 513 and the operation of each of the sections of the display unit 1C, for example, on the basis of setting information inputted from the remote-control receiving circuit 519. On the basis of the setting information inputted from the remote-control receiving circuit 519, for example, the arithmetic circuit 514 further generates image data for a UI to be used for screen displaying, and outputs the generated image data to the inverting input section 525. The inverting input section 525 generates inverted image data in which the image data is inverted vertically, and outputs the generated inverted image data to the image projection section 50b (video signal processing circuit 51).

The decoder 515 performs decode processing, for example, on an image PES packet included in the partial TS obtained by the demultiplexer 513 to thereby obtain image data. In addition, the decoder 515 performs the decode processing, for example, on an audio PES packet included in the partial TS obtained by the demultiplexer 513 to thereby obtain audio data.

On the basis of the image data inputted from the decoder 515, the image projection section 50b generates the image light Lb1, and irradiates the second main surface Sb.

The audio signal processing circuit 516 performs processing such as D/A conversion, for example, on the audio data obtained by the decoder 515. The audio amplification circuit 517 amplifies the audio signal outputted from the audio signal processing circuit 516, for example, to supply the amplified audio signal to the speaker 518.

The remote-control receiving circuit 519 receives a remote-control signal transmitted from the remote-control transmitter 1B, for example, to supply the received remote-control signal to the arithmetic circuit 514.

Operation

Next, description is given of an operation of the display apparatus 1 according to the present embodiment.

An observer 100 uses the remote-control transmitter 1B, for example, to perform channel selection of images to be displayed on the first main surface Sa and the second main surface Sb. Then, the remote-control transmitter 1B generates a remote-control signal according to an operation by the observer 100 to transmit the generated remote-control signal to the remote-control receiving circuits 509 and 519. The remote-control receiving circuits 509 and 519 output the received remote-control signal to the arithmetic circuits 504 and 514. In a case where the inputted remote-control signal is a signal related to image display on the side of the second main surface Sb, the arithmetic circuit 504 performs control based on the inputted remote-control signal. In a case where the inputted remote-control signal is a signal related to image display on the side of the first main surface Sa, the arithmetic circuit 514 performs control based on the inputted remote-control signal. Suppose, in this example, that the inputted remote-control signal is a signal related to image display on each of the first main surface Sa and the second main surface Sb.

The demultiplexer 513 extracts the partial TS corresponding to a selected channel on the side of the first main surface Sa from the transport stream obtained by the digital tuner 512. The decoder 515 performs the decode processing on the image PES packet included in the partial TS obtained by the demultiplexer 513 to thereby obtain image data. In addition, the decoder 515 performs the decode processing on the audio PES packet included in the partial TS obtained by the demultiplexer 513 to thereby obtain audio data.

On the basis of the image data inputted from the decoder 515, the image projection section 50b generates the image light Lb1, and irradiates the second main surface Sb. The image light Lb1 is incident on the second main surface Sb at an angle near such an angle as to satisfy the Bragg's diffraction condition for the transmissive volume hologram, and is diffracted to the side of the first main surface Sa. As a result, the diffracted light is emitted as the image light Lb2 from the first main surface Sa, and an image corresponding to the selected channel on the side of the first main surface Sa is displayed on the first main surface Sa. The audio signal processing circuit 516 performs processing such as D/A conversion for the audio data obtained by the decoder 515. The audio amplification circuit 517 amplifies the audio signal outputted from the audio signal processing circuit 516 to supply the amplified audio signal to the speaker 518. The speaker 518 outputs an audio corresponding to the inputted audio signal toward the front of the first main surface Sa (i.e., the observer 100).

Meanwhile, the demultiplexer 503 extracts a partial TS corresponding to the selected channel on the side of the second main surface Sb from the transport stream obtained by the digital tuner 502. The decoder 505 performs the decode processing on the image PES packet included in the partial TS obtained by the demultiplexer 503 to thereby obtain image data. In addition, the decoder 505 performs the decode processing on the audio PES packet included in the partial TS obtained by the demultiplexer 503 to thereby obtain audio data.

On the basis of the image data inputted from the decoder 505, the image projection section 50a generates the image light La1, and irradiates the first main surface Sa. The image light La1 is incident on the first main surface Sa at an angle near such an angle as to satisfy the Bragg's diffraction condition for the transmissive volume hologram, and is diffracted to the side of the second main surface Sb. As a result, the diffracted light is emitted as the image light La2 from the second main surface Sb, and an image corresponding to the selected channel on the side of the second main surface Sb is displayed on the second main surface Sb. The audio signal processing circuit 506 performs processing such as D/A conversion for audio data obtained by the decoder 505. The audio amplification circuit 507 amplifies the audio signal outputted from the audio signal processing circuit 506 to supply the amplified audio signal to the speaker 508. The speaker 508 outputs an audio corresponding to the inputted audio signal toward the front of the second main surface Sb (i.e., an observer 200).

In this manner, the image display is performed on each surface of the HOE screen 10.

Workings and Effects

Next, description is given of workings and effects of the display apparatus 1 according to the present embodiment.

In the present embodiment, the base section 40*a* prevents external light from being directly incident on the first main surface Sa at least at the same incident angle as that of the image light La1 from the side of the base section 40*a*. In addition, the eave section 30*b* prevents external light from being directly incident on the second main surface Sb at least at the same incident angle as that of the image light Lb1 from the side of the eave section 30*b*. This makes it possible to prevent diffracted external light from being superimposed on the image light La2 and the image light Lb2. As a result, it is possible to clearly display an image in a bright environment.

In addition, in the present embodiment, the image projection section 50*a* is disposed at the location corresponding to the lower end of the HOE screen 10, and the image projection section 50*b* is disposed at the location corresponding to the upper end of the HOE screen 10. This makes it possible to dispose the image projection sections 50*a* and 50*b* without impairing a design property.

In addition, in the present embodiment, the image projection section 50*a* is disposed inside the base section 40*a*, and the image projection section 50*b* is disposed inside the eave section 30*b*. This makes it possible to dispose the image projection sections 50*a* and 50*b* without impairing a design property.

In addition, in the present embodiment, the base section 40*a* is positioned at a distance of a tangent at the slant angle θ1 of the volume hologram, from the location corresponding to the lower end of the HOE screen 10. In addition, the eave section 30*b* is positioned at a distance of a tangent at the slant angle θ1 of the volume hologram, from the location corresponding to the upper end of the HOE screen 10. This allows the base section 40*a* to prevent external light from being directly incident on the first main surface Sa at least at the same incident angle as that of the image light La1 from the side of the base section 40*a*. In addition, the eave section 30*b* prevents external light from being directly incident on the second main surface Sb at least at the same incident angle as that of the image light Lb1 from the side of the eave section 30*b*. This makes it possible to prevent diffracted external light from being superimposed on the image light La2 and the image light Lb2. As a result, it is possible to clearly display an image in a bright environment.

In addition, in the present embodiment, the base sections 40*a* and 40*b* hold the location corresponding to the lower end of the HOE screen 10, and the eave sections 30*a* and 30*b* hold the location corresponding to the upper end of the HOE screen 10. This allows, for example, the base sections 40*a* and 40*b* to be fixed to a table and the eave sections 30*a* and 30*b* to be fixed to the ceiling, thereby enabling installation of the HOE screen 10. In this manner, in the present embodiment, it is possible to install the HOE screen 10 without impairing a design property.

In addition, in the present embodiment, the AR films 20*a* and 20*b* are provided on the first main surface Sa and the second main surface Sb. This makes it possible to prevent an image quality from being impaired by external light reflection at the first main surface Sa and the second main surface Sb. In addition, in the present embodiment, in a case where the AR film 20*a* is provided only on the first main surface Sa, it is possible to prevent the image quality from being impaired by the external light reflection at the first main surface Sa. In addition, in the present embodiment, in a case where the AR film 20*b* is provided only on the second main surface Sb, it is possible to prevent the image quality from being impaired by the external light reflection at the second main surface Sb.

2. MODIFICATION EXAMPLES

Modification Example A

In the foregoing embodiment, an image by television broadcasting is displayed. However, in the foregoing embodiment, an image other than that of the television broadcasting (e.g., image by data communication) may be displayed. At this time, the display unit 1A may include, for example, a communication section 521 and an arithmetic circuit 522, instead of the antenna terminal 501, the digital tuner 502, the demultiplexer 503, the arithmetic circuit 504 and the decoder 505, as illustrated in FIG. 5. In addition, the display unit 1C may include, for example, a communication section 523 and an arithmetic circuit 524, instead of the antenna terminal 511, the digital tuner 512, the demultiplexer 513, the arithmetic circuit 514 and the decoder 515, as illustrated in FIG. 6.

The communication sections 521 and 523 are able to communicate with external apparatuses via a network. Here, the network is, for example, a network that performs communication using a communication protocol (TCP/IP) utilized normally in the Internet. The network may be, for example, a secure network that performs communication using an own communication protocol of the network. The network is, for example, the Internet, an intranet, or a local area network. For example, coupling between the network and the communication sections 521 and 523 may be made by a wired LAN (Local Area Network) such as Ethernet (registered trademark), or may be made by a wireless LAN such as Wi-Fi, a mobile phone line, or the like.

The communication section 521 outputs image data acquired from an external apparatus via a network to the arithmetic circuit 522. The communication section 523 outputs image data acquired from an external apparatus via a network to the arithmetic circuit 524.

The arithmetic circuit 522 acquires image data via the communication section 521 and the network on the basis of setting information inputted from the remote-control receiving circuit 509, for example. The arithmetic circuit 522 outputs the acquired image data to the image projection section 50*a*, and outputs audio data included in the acquired image data to the audio signal processing circuit 506. The arithmetic circuit 524 acquires image data via the communication section 523 and the network on the basis of setting information inputted from the remote-control receiving circuit 509, for example. The arithmetic circuit 524 outputs the acquired image data to the inverting input section 525, and outputs audio data included in the acquired image data to the audio signal processing circuit 516.

In the present modification example, an image other than that of television broadcasting (e.g., image by data communication) is displayed on each surface of the HOE screen 10. This makes it possible to achieve various types of image display.

Modification Example B

In the foregoing embodiment and modification example thereof, as illustrated in FIGS. 7, 8, 9, and 10, a communication section 526 may be provided instead of the remote-control receiving circuit 509, a communication section 527 may be provided instead of the remote-control receiving circuit 519, and an input unit 1D may be provided instead of the remote-control transmitter 1B.

The input unit 1D is configured by, for example, a mobile terminal, a smartphone, or the like, and is able to communicate with the communication sections 526 and 527, for example, via a network. The communication sections 526 and 527 are able to communicate with the input unit 1D, for example, via the network. Here, the network is, for example, a network that performs communication using a communication protocol (TCP/IP) utilized normally in the Internet. The network may be, for example, a secure network that performs communication using an own communication protocol of the network. The network is, for example, the Internet, an intranet, or a local area network. For example, coupling between the network and the communication sections 526 and 527 may be made by a wired LAN such as Ethernet (registered trademark), or may be made by a wireless LAN such as Wi-Fi, a mobile phone line, or the like.

It is to be noted that the input unit 1D may be configured by a keyboard, a mouse, or the like. At this time, for example, the input unit 1D may be able to communicate with the communication sections 526 and 527 via the network described above, or may be able to communicate with the communication sections 526 and 527 in a wired manner.

Modification Example C

In the foregoing embodiment, the HOE screen 10 configured by the transmissive volume hologram is used. However, in the foregoing embodiment, an HOE screen 60 configured by a reflective volume hologram may be used, for example, as illustrated in FIG. 7. At this time, the HOE screen 60 is configured by the reflective volume hologram. At this time, the HOE screen 60 diffracts light incident at an angle near such an angle as to satisfy Bragg's diffraction condition for the reflective volume hologram, out of light (image light La1) incident on the first main surface Sa, toward the front of the first main surface Sa. The diffracted light at this time is emitted as image light La3 from the first main surface Sa. The HOE screen 60 further diffracts light incident at an angle near such an angle as to satisfy the Bragg's diffraction condition for the transmissive volume hologram, out of light (image light Lb1) incident on the second main surface Sb, toward the front of the second main surface Sb. The diffracted light at this time is emitted as image light Lb3 from the second main surface Sb. An interference fringe with an inclination angle (slant angle θ1) is formed on the HOE screen 60. Here, the inclination angle (slant angle θ1) refers to an angle formed between a surface of the reflective volume hologram and the interference fringe. The interference fringe is formed from the inside of the reflective volume hologram to the surface thereof. The interference fringe satisfies the Bragg condition.

In the present modification example, the image projection section 50a is configured to cause the image light La1 to be incident on the first main surface Sa at an angle near such an angle as to satisfy the Bragg's diffraction condition for the reflective volume hologram. The image projection section 50a is further configured to cause the image light La1 to be diffracted toward the front of the first main surface Sa in the reflective volume hologram. The image projection section 50b is configured to cause the image light Lb1 to be incident on the second main surface Sb at an angle near such an angle as to satisfy the Bragg's diffraction condition for the reflective volume hologram. The image projection section 50b is further configured to cause the image light Lb1 to be diffracted toward the front of the second main surface Sb in the reflective volume hologram.

In the present modification example, in a case where an inputted remote-control signal is a signal related to image display on the side of the first main surface Sa, the arithmetic circuit 504 performs control based on the inputted remote-control signal. In a case where the inputted remote-control signal is a signal related to image display on the side of the second main surface Sb, the arithmetic circuit 514 performs control based on the inputted remote-control signal.

In the present modification example, the image light Lb1 is incident on the second main surface Sb at an angle near such an angle as to satisfy the Bragg's diffraction condition for the reflective volume hologram, and is diffracted toward the front of the second main surface Sb. As a result, the diffracted light is emitted as the image light Lb3 from the second main surface Sb, and an image corresponding to the selected channel on the side of the second main surface Sb is displayed on the second main surface Sb. Meanwhile, the image light La1 is incident on the first main surface Sa at an angle near such an angle as to satisfy the Bragg's diffraction condition for the reflective volume hologram, and is diffracted toward the front of the first main surface Sa. As a result, the diffracted light is emitted as the image light La3 from the first main surface Sa, and an image corresponding to the selected channel on the side of the first main surface Sa is displayed on the first main surface Sa.

In the present modification example, the eave sections 30a and 30b have configurations similar to those of the foregoing embodiment. Further, in the present modification example, the base sections 40a and 40b have configurations similar to those of the foregoing embodiment. Therefore, in the present modification example, it is possible to prevent diffracted external light from being superimposed on the image light La2 and the image light Lb2, similarly to the foregoing embodiment, thus making it possible to clearly display an image in a bright environment.

Modification Example D

In the foregoing embodiment and modification examples thereof, a glass plate may be provided between the HOE screen 10 or 60 and one of the AR film 20a and the AR film 20b. For example, as illustrated in FIGS. 12 and 13, a glass plate 70 may be provided between the HOE screen 10 or 60 and the AR film 20b. In this case, the image projection section 50b is disposed in consideration of refraction by the glass plate 70. The glass plate 70 is, for example, a window glass or a show window. It is to be noted that a transparent resin plate, instead of the glass plate 70, may be provided between the HOE screen 10 or 60 and one of the AR film 20a and the AR film 20b. Also in such a case, effects similar to those of the foregoing embodiment and modification examples thereof are obtained.

3. APPLICATION EXAMPLES

Next, description is given of application examples of the display apparatus 1 according to the foregoing embodiment and modification examples thereof.

Application Example 1

FIGS. 14 and 15 each illustrate an example in which the display apparatus 1 according to the foregoing embodiment and modification examples thereof is installed as a partition in a kitchen 300. The HOE screens 10 and 60 are each a transparent screen as described above. Therefore, even in a case where the HOE screen 10 or 60 is installed as a partition in the kitchen 300, it is possible to view around a living room space from a space of the kitchen 300.

Now suppose that a mother is cooking in the space of the kitchen 300 and that a child of the mother is playing in the living room. At this time, the mother operates the remote-control transmitter 1B or the input unit 1D to thereby display a cooking program TV1 on a surface (e.g., first main surface Sa), of the HOE screen 10 or 60, on side of the kitchen 300, and display a children's program TV2 on a surface (e.g., second main surface Sb), of the HOE screen 10 or 60, on side of the living room, for example, as illustrated in FIG. 14. In such a case, the mother is able to confirm a state of the child through a location, of the HOE screen 10 or 60, where the cooking program TV1 is not displayed, while watching the cooking program TV1. In addition, the child is able to confirm a state of the mother through a location, of the HOE screen 10 or 60, where the children's program TV2 is not displayed, while watching the children's program TV2.

In addition, suppose that the mother is cooking in the space of the kitchen 300 and that the child of the mother is playing in the living room. At this time, the mother operates the remote-control transmitter 1B or the input unit 1D to thereby display a recipe video DT1 on a surface (e.g., first main surface Sa), of the HOE screen 10 or 60, on the side of the kitchen 300, and display an animation video DT2 on a surface (e.g., second main surface Sb), of the HOE screen 10 or 60, on the side of the living room, for example, as illustrated in FIG. 15. In such a case, the mother is able to confirm a state of the child through a location, of the HOE screen 10 or 60, where the recipe video DT1 is not displayed, while watching the recipe video DT1. In addition, the child is able to confirm a state of the mother through a location, of the HOE screen 10 or 60, where the animation video DT2 is not displayed, while watching the animation video DT2.

Application Example 2

FIG. 16 illustrates an example in which the display apparatus 1 according to the foregoing embodiment and modification examples thereof is used as a screen of a game machine 400. For example, the display apparatus 1 is provided one by one for each of seats for persons playing the game machine 400. The HOE screens 10 and 60 are each a transparent screen as described above. Therefore, game players are able to confirm a state of an event being performed by the game machine 400 through the HOE screen 10 while sitting in the seat.

Now suppose that the game machine 400 is provided for a game that involves running racehorses 410, 420, and 430 to predict a winner. At this time, the game player operates the remote-control transmitter 1B or the input unit 1D to thereby display, for example, data DT3 on the racehorses 410, 420, and 430 that are visible through the HOE screen 10 or 60 on a surface (e.g., first main surface Sa), of the HOE screen 10 or 60, on side of the game player. At this time, data DT4 on a current ranking of the racehorses 410, 420, and 430 is displayed on a surface (e.g., second main surface Sb), of the HOE screen 10 or 60, on side opposite to the game player. In such a case, the game player is able to confirm the data DT3 and the data DT4 displayed on the HOE screen 10 or 60 provided for the game player facing the screen while watching a state in which racehorses 410, 420, and 430 are running.

Application Example 3

FIG. 17 illustrates an example in which the display apparatus 1 according to the foregoing embodiment and modification examples thereof is installed on a reception table 500. The HOE screens 10 and 60 are each a transparent screen as described above. Therefore, even in a case where the HOE screen 10 or 60 is installed on the reception table 500, it is possible to view around the surrounding space from a space of the reception.

Now suppose that a reception lady stands in the back of the reception table 500 and that a foreign visitor stands in front of the reception table 500. At this time, the reception lady operates the remote-control transmitter 1B or the input unit 1D to thereby display, for example, a Japanese guide map MAP1 on a surface (e.g., first main surface Sa), of the HOE screen 10 or 60, on back side of the reception table 500, and display an English guide map MAP2 on a surface (e.g., second main surface Sb), of the HOE screen 10 or 60, on front side of the reception table 500. In such a case, the reception lady is able to explain a route to a destination to the foreign visitor while viewing the Japanese guide map MAP1, and the foreign visitor is able to listen to the explanation of the reception lady while viewing the English guide map MAP2.

Although the description has been given hereinabove of the present disclosure with reference to the embodiment and modification examples thereof, and the application examples, the present disclosure is not limited to the foregoing embodiments, etc., and various modifications may be made. It is to be noted that the effects described herein are merely illustrative. The effects of the present disclosure are not limited to those described herein. The present disclosure may have other effects than those described herein.

In addition, the present disclosure may have the following configurations.

(1)

A display apparatus including:
  a transparent screen configured by a transmissive or reflective volume hologram;
  a first image projection section that is disposed on side of a first main surface of the transparent screen, and projects first image light onto the first main surface;
  a second image projection section that is disposed on side of a second main surface of the transparent screen, and projects second image light onto the second main surface;
  a first light-shielding section that prevents external light from being directly incident on the first main surface at least at same incident angle as the first image light; and a second light-shielding section that prevents external light from being directly incident on the second main surface at least at same incident angle as the second image light.

(2)

The display apparatus according to (1), in which the first image projection section is disposed at a location corresponding to a lower end of the transparent screen, and the second image projection section is disposed at a location corresponding to an upper end of the transparent screen.

(3)

The display apparatus according to (1) or (2), in which the first light-shielding section is disposed at a location corresponding to the lower end of the transparent screen, the second light-shielding section is disposed at a location corresponding to the upper end of the transparent screen, the first image projection section is disposed inside the first light-shielding section, and the second image projection section is disposed inside the second light-shielding section.

(4)

The display apparatus according to any one of (1) to (3), in which the first light-shielding section is positioned at a distance of a tangent at a slant angle of the volume hologram from the location corresponding to the lower end of the transparent screen, and the second light-shielding section is positioned at a distance of a tangent at a slant angle of the volume hologram from the location corresponding to the upper end of the transparent screen.

(5)

The display apparatus according to any one of (1) to (4), in which the first light-shielding section holds the location corresponding to the lower end of the transparent screen, and the second light-shielding section holds the location corresponding to the upper end of the transparent screen.

(6)

The display apparatus according to any one of (1) to (5), further including an AR film on at least one of the first main surface or the second main surface.

The display apparatus according to an embodiment of the present disclosure includes the first light-shielding section that prevents external light from being directly incident on the first main surface at least at the same incident angle as the first image light, and the second light-shielding section that prevents external light from being directly incident on the second main surface at least at the same incident angle as the second image light, thus making it possible to clearly display an image in a bright environment. It is to be noted that the effects of the present disclosure are not necessarily limited to the effects described here, and may be any of the effects described herein.

This application claims the benefit of Japanese Priority Patent Application JP2018-230783 filed with the Japan Patent Office on Dec. 10, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display apparatus, comprises:

a transparent screen having a volume hologram, wherein the volume hologram is one of a transmissive volume hologram or a reflective volume hologram;

a first image projection section on a side of a first main surface of the transparent screen, wherein the first image projection section is configured to project first image light onto the first main surface;

a second image projection section on a side of a second main surface of the transparent screen, wherein the second image projection section is configured to project second image light onto the second main surface;

a first light-shielding section configured to prevent external light from being directly incident on the first main surface at least at a first incident angle, wherein the first incident angle is same as an incident angle of the first image light; and a second light-shielding section configured to prevent the external light from being directly incident on the second main surface at least at a second incident angle, wherein the second incident angle is same as an incident angle of the second image light, and each of the first light-shielding section and the second light-shielding section comprises an inclined surface with an angle larger than a slant angle of the volume hologram.

2. The display apparatus according to claim 1, wherein the first image projection section is at a first location corresponding to a lower end of the transparent screen, and the second image projection section is at a second location corresponding to an upper end of the transparent screen.

3. The display apparatus according to claim 2, wherein the first light-shielding section is at the first location corresponding to the lower end of the transparent screen, the second light-shielding section is at the second location corresponding to the upper end of the transparent screen, the first image projection section is inside the first light-shielding section, and the second image projection section is inside the second light-shielding section.

4. The display apparatus according to claim 3, wherein the first light-shielding section is at a distance of a tangent at the slant angle of the volume hologram from the first location corresponding to the lower end of the transparent screen, and the second light-shielding section is at the distance of the tangent at the slant angle of the volume hologram from the second location corresponding to the upper end of the transparent screen.

5. The display apparatus according to claim 4 wherein the first light-shielding section is further configured to hold the first location corresponding to the lower end of the transparent screen, and the second light-shielding section is further configured to hold the second location corresponding to the upper end of the transparent screen.

6. The display apparatus according to claim 1, further comprises an AR film on at least one of the first main surface or the second main surface.

* * * * *